US008842042B2

(12) United States Patent
Rideout et al.

(10) Patent No.: US 8,842,042 B2
(45) Date of Patent: Sep. 23, 2014

(54) SATELLITE EPHEMERIS ERROR

(75) Inventors: Robert Martin Rideout, Worcestershire (GB); Simon Robert Duck, Worcestershire (GB); David Patrick Haworth, Worcestershire (GB)

(73) Assignee: Kratos Integral Holdings, LLC, San Diego, CA (US)

( * ) Notice: Subject to any disclaimer, the term of this patent is extended or adjusted under 35 U.S.C. 154(b) by 210 days.

(21) Appl. No.: 12/293,186

(22) PCT Filed: Mar. 22, 2007

(86) PCT No.: PCT/GB2007/001039
§ 371 (c)(1),
(2), (4) Date: Sep. 16, 2008

(87) PCT Pub. No.: WO2007/113475
PCT Pub. Date: Oct. 11, 2007

(65) Prior Publication Data
US 2009/0073039 A1    Mar. 19, 2009

(30) Foreign Application Priority Data

Mar. 31, 2006  (GB) .................................. 0606501.5

(51) Int. Cl.
| | | |
|---|---|---|
| *G01S 19/27* | (2010.01) | |
| *G01S 19/02* | (2010.01) | |
| *G01S 5/06* | (2006.01) | |
| G01S 19/08 | (2010.01) | |
| G01S 19/05 | (2010.01) | |
| G01S 19/25 | (2010.01) | |
| G01S 19/20 | (2010.01) | |

(52) U.S. Cl.
CPC . *G01S 5/06* (2013.01); *G01S 19/08* (2013.01); *G01S 19/05* (2013.01); *G01S 19/02* (2013.01); *G01S 19/258* (2013.01); *G01S 19/20* (2013.01); *G01S 19/27* (2013.01)
USPC ................................ 342/357.66; 342/357.45

(58) Field of Classification Search
CPC ....... G01S 19/27; G01S 19/258; G01S 19/05; G01S 19/08; G01S 19/20
USPC .............. 342/357.02, 357.12, 357.45, 357.66
See application file for complete search history.

(56) References Cited

U.S. PATENT DOCUMENTS 5,008,679 A    4/1991  Effland et al.
5,534,882 A *  7/1996  Lopez ........................... 343/891
(Continued)

FOREIGN PATENT DOCUMENTS

GB           2295063         5/1996

OTHER PUBLICATIONS

Van Loan, Charles "On the Method of Weighting for Equality-Constrained Least-Squares Problems", SIAM J. Numer. Anal, vol. 22, No. 5, Oct. 1985.*

(Continued)

*Primary Examiner* — Frank J McGue
(74) *Attorney, Agent, or Firm* — Procopio, Cory, Hargreaves & Savitch, LLP

(57) ABSTRACT

A method of compensating for or correcting satellite ephemeris error involves measuring time difference of arrival (TDOA) and frequency difference of arrival (FDOA) for signal replicas received via two satellites (34, 46) from calibration transmitters (42a to 42d) at different geographical locations. An initial satellite ephemeris consisting of position and velocity vectors is used to calculate ephemeris changes yielding estimated TDOA and FDOA values providing a best fit to measured TDOA and FDOA values. This provides estimated changes required to compensate for or to correct errors in the initial satellite ephemeris. The method may be iterated to deal with large ephemeris changes: i.e. the changes obtained in one iteration may be used to correct ephemeris for use as a new initial ephemeris in a following iteration. The method may be used to correct ephemeris errors in one or both satellites, if so a greater number of calibration transmitters EphemCal 1 to EphemCal 10 may be used.

6 Claims, 8 Drawing Sheets

(56) References Cited

U.S. PATENT DOCUMENTS

| | | | |
|---|---|---|---|
| 5,594,452 A | | 1/1997 | Webber et al. |
| 5,808,582 A | * | 9/1998 | Woo .................. 342/357.61 |
| 5,825,328 A | * | 10/1998 | Schipper et al. ......... 342/357.29 |
| 5,949,372 A | * | 9/1999 | Lennen .................. 342/357.62 |
| 6,018,312 A | * | 1/2000 | Haworth .................. 342/353 |
| 6,618,009 B2 | * | 9/2003 | Griffin et al. .............. 342/432 |
| 6,677,893 B2 | | 1/2004 | Rideout et al. |
| 7,388,541 B1 | * | 6/2008 | Yang .................. 342/464 |
| 7,453,961 B1 | * | 11/2008 | Li et al. .................. 375/343 |
| 2002/0070889 A1 | * | 6/2002 | Griffin et al. .............. 342/353 |
| 2004/0178953 A1 | | 9/2004 | Trautenberg |
| 2009/0073039 A1 | * | 3/2009 | Rideout et al. ........... 342/357.12 |
| 2010/0171657 A1 | * | 7/2010 | Liu |

OTHER PUBLICATIONS

Bardelli et al., "Interference Localisation for The Eutelsat Satellite System", Global Telecommunications Conference, 1995. Conference Record. Communication Theory Mini-Conference, Globecom '95., IEEE Singapore Nov. 13-17, 1995, New York, NY, USA IEEE, US vol. 3, Nov. 13, 1995, pp. 1641-1651.

Communications Satellite Interference Users Conference, Sep. 21-22, 1993, Sep. 21, 1400, "A Transmitter Location System, John Effland, Interferometrics", Sep. 22, 1000, "Interference Location Results using the TLS", John Webber, Interferometrics; Vienna, Virginia.

International Journal of Satellite Communication, "Interference Localization for Eutelsat Satellites—The First European Transmitter Location System", vol. 15, 55-183 (1997).

Suirg Fall 1995 Conference, "Reduction of the Impact of Ephemeris Errors on Transmitter Location Systems", DRA Defford, Worcs, W8 9DU, UK.

AAS/AIAA Spaceflight Mechanics Meeting, "The Orbit Determination Tool Kit (ODTK)—Version 5", Feb. 2007, Sedona, Arizona, USA.

GLOBECOM 95', "Interference localization for the Eutelsat satellite system", 1995, 1641-1651, IEEE.

* cited by examiner

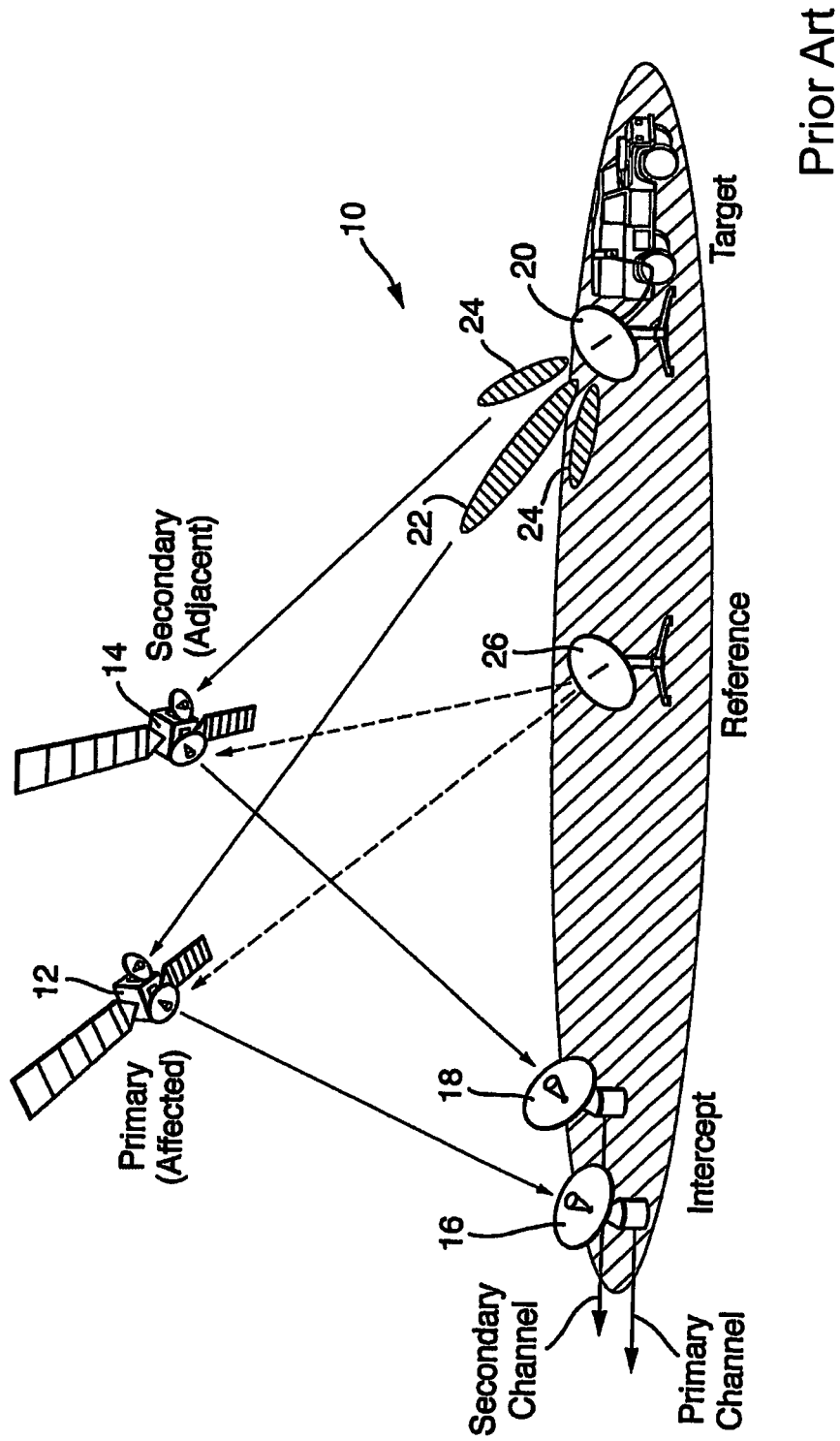

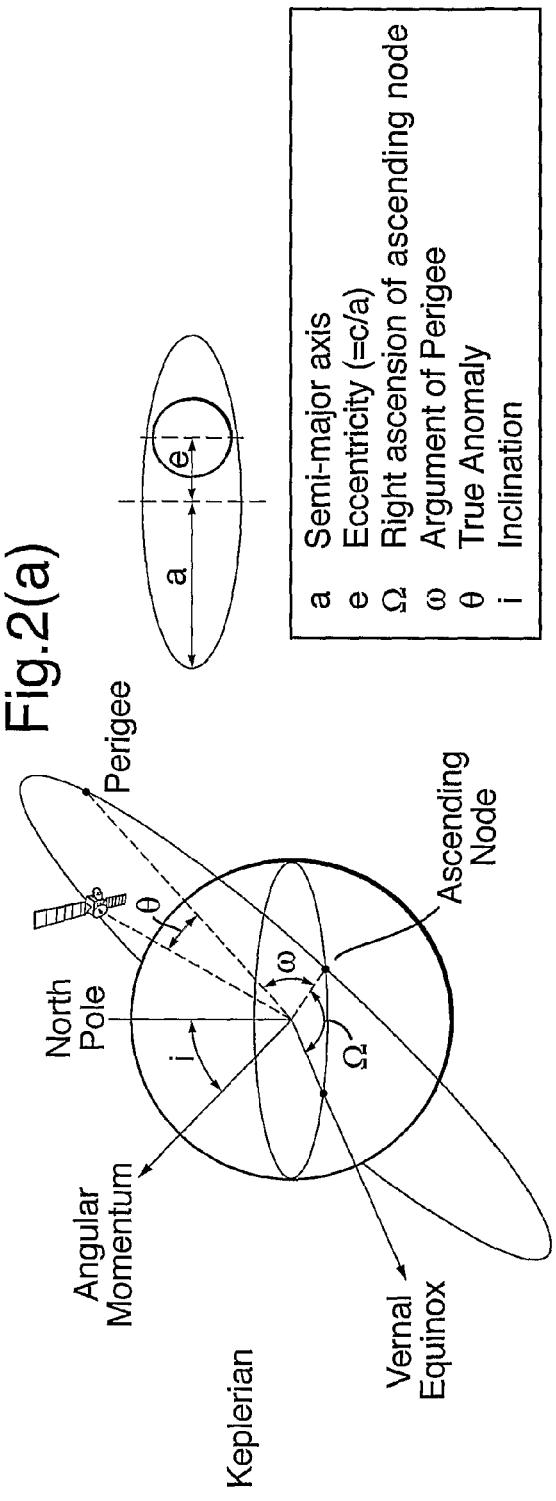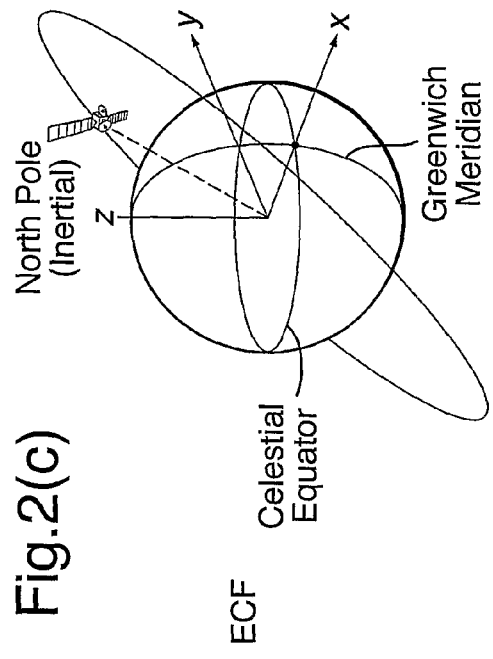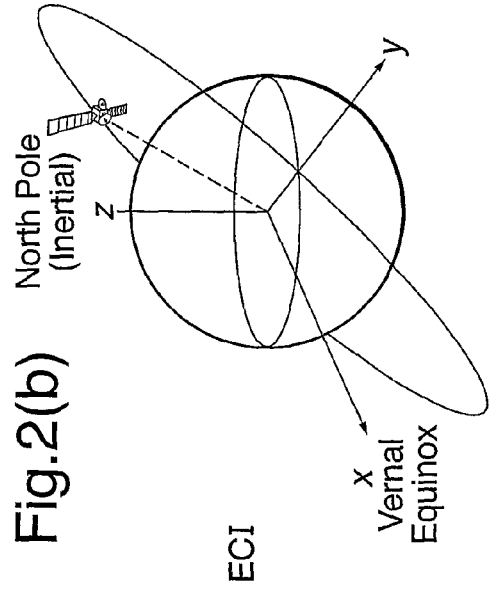

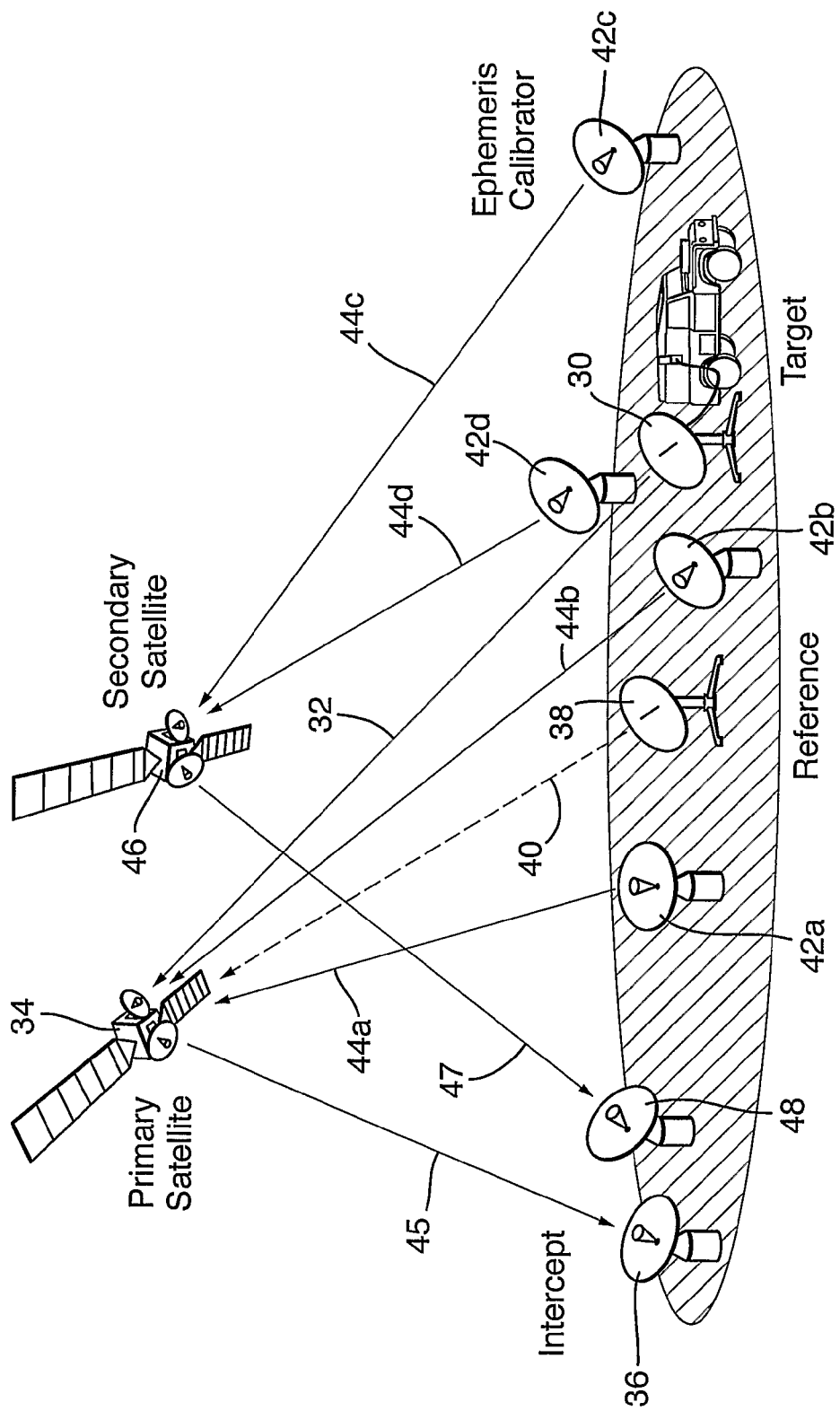

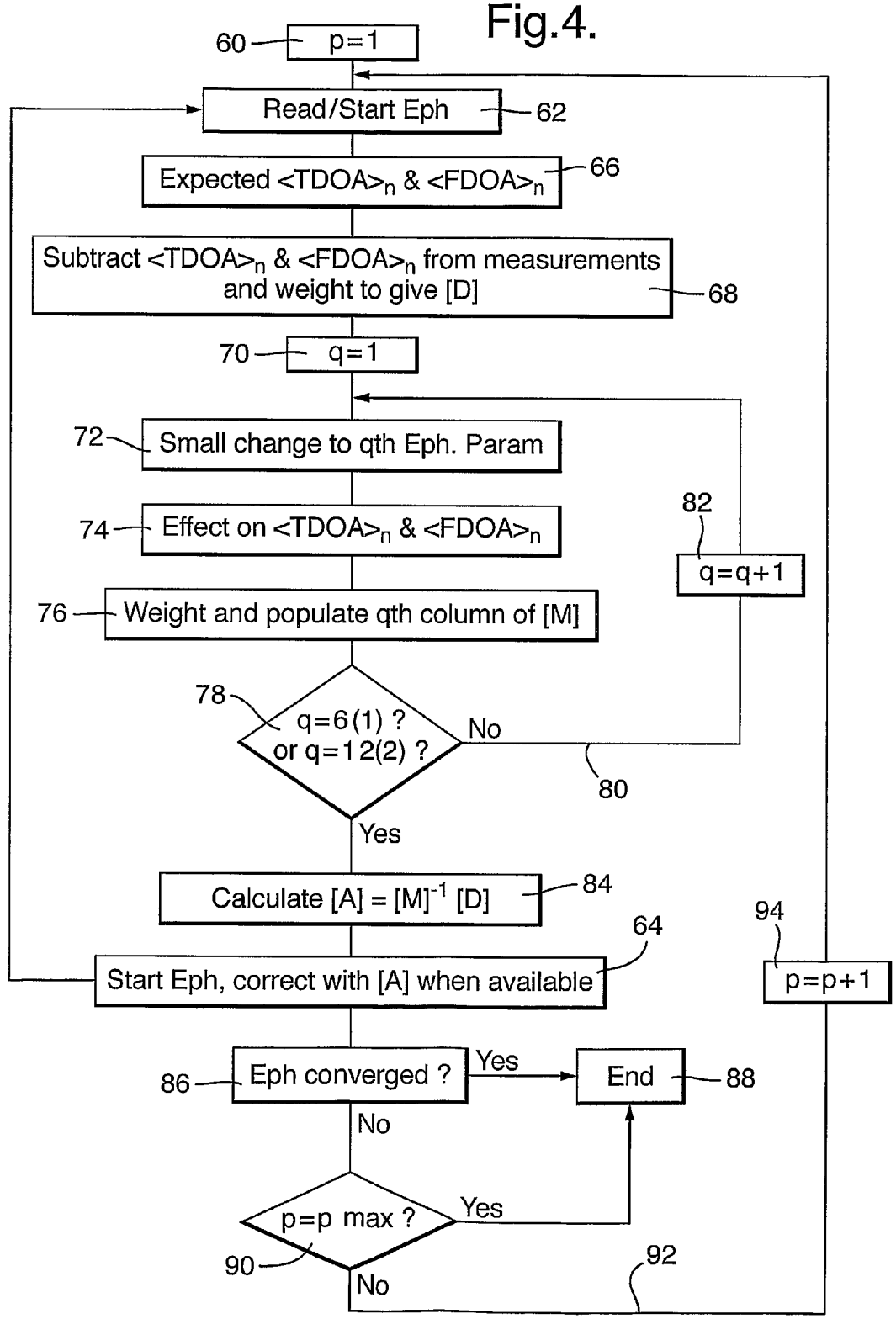

SATELLITE EPHEMERIS ERROR

This invention relates to satellite ephemeris error, and more particularly (although not exclusively) to its determination and/or compensation for errors in geolocation measurements arising because of it.

A satellite ephemeris or ephemeris set is a list of at least six parameters together with an associated time instant from which it is possible to calculate position and velocity in space of an Earth-orbiting satellite. It is an important quantity for a number of reasons, but one particularly important use is in the field of geolocation, i.e. locating ground-based transmitters or ground stations responsible for unauthorised use of or interference in satellite telecommunications channels. It is necessary to have satellite ephemeris information before conventional geolocation techniques can be used. An ephemeris has a format which is dependent on its co-ordinate system. Keplerian elements are most commonly referred to where the motion of an orbiting body is described with reference from the Earth's origin to a fixed point in space. The two most common reference frames of this type are Earth Centred Inertial (ECI) and Earth Centred Fixed (ECF).

Unauthorised access to satellites is a problem which can vary from mere inconvenience to complete denial of satellite access to a legitimate user. Occurrences of interference are increasing due to proliferation of satellite-based services, emergence of personal satellite communications, increasing congestion of a geostationary arc occupied by orbiting satellites and jamming of TV broadcasts. Interference may frequently result from human error (e.g. a misaligned antenna) or equipment failure, but it may also represent a deliberate attempt to misappropriate bandwidth or to deny services to legitimate users.

To eradicate satellite interference, it is necessary to locate geographically a ground station transmitter responsible for it. Such geolocation is well-known, and currently satellite ephemeris error is an important (usually the most dominant) source of inaccuracy.

In IEEE Trans. on Aerospace and Electronic Systems, Vol. AES-18, No. 2, March 1982, P C Chestnut describes the basic technique of locating an unknown signal source: it involves determining the time difference of arrival (TDOA) and/or frequency difference of arrival (FDOA) of replicas of signals from the source relayed along two independent signal paths to a receiving station. TDOA and FDOA are also known in the prior art as respectively differential time offset (DTO) and differential frequency offset (DFO) or differential Doppler. Determination of DTO and DFO from two received signals is described in IEEE Trans. on Acoustics Speech and Signal Processing, Vol. ASSP-29, No. 3, June 1981 by S Stein in "Algorithms for Ambiguity Function Processing". The technique involves computing the correlation between the received signals with trial time shifts and frequency offsets relative to one another. The time shift and frequency offset which maximise the correlation are the required DTO and DFO, subject to correction for offsets introduced in satellites. From the DTO and DFO, an interfering transmitter location on the surface of the Earth can be determined (geolocated) as disclosed in U.S. Pat. No 5,008,679. This patent discloses location of a target transmitter with two geostationary relay satellites using TDOA (or DTO) and FDOA (or DFO) measurements. The locus of points of constant TDOA or FDOA is a surface which intercepts the Earth's surface to define a curve referred to as a line of position (LOP). Measurement of TDOA and FDOA provides two LOPs which intersect at the position of the target transmitter to be determined.

U.S. Pat. No. 6,018,312 (Haworth) discloses geolocation via satellites with error correction using a phase coherent reference signal. A related technique using a broad band approach is disclosed in U.S. Pat. No. 5,594,452 (Webber et al.). U.S. Pat. No. 6,618,009 (Griffin et al.) relates to geolocation with time-varying DTO and DFO. U.S. Pat. No. 6,677,893 (Rideout et al.) relates to geolocation with frequency agile interference.

The coherent reference technique of U.S. Pat. No. 6,018,312 mitigates the effects of ephemeris error: these effects decrease as the target-reference separation is reduced. Unfortunately, even with a reference transmitter relatively close to a target transmitter, ephemeris errors are still typically the dominant uncertainties in a geolocation result.

The accuracy of prior art geolocation is highly dependent on the accuracy of the two satellite ephemerides used in the calculation. Satellite ranging measurements and subsequent ephemeris calculations are normally only made to a precision which is adequate to enable ground stations to track satellites. More detailed ephemeris data are sometimes produced to enable satellite operators to calculate manoeuvre requirements, but these normally take 24 hours to calculate and are not supplied to network users as a matter of course. Acquisition of high precision ephemerides necessary for accurate geolocation is uncommon, and ephemeris error is often the dominant source of inaccuracy in a geolocation result.

It is an object of this invention to provide a technique for determination of satellite ephemeris error and/or for compensation for errors in geolocation measurements arising because of satellite ephemeris error.

The present invention provides a method of compensating for or correcting satellite ephemeris error incorporating the steps of:

a. determining at least one of time difference and frequency difference associated with signal replicas received via different satellites from calibration transmitting means of known location; and b. obtaining estimates corresponding to satellite ephemeris elements and calculating changes thereto giving rise to at least one of time difference and frequency difference estimations in closer conformity with corresponding measured time difference and/or frequency difference.

The invention compensates or corrects for satellite ephemeris error depending on whether it is used with one or two satellites having satellite ephemeris error. The invention provides the advantage that it makes more accurate ephemeris data available, particularly (but without limitation) for use geolocation of ground-based transmitters causing unauthorised use of or interference in satellite telecommunications channels.

Step a) may comprise determining both time difference and frequency difference associated with the signal replicas. The calibration transmitting means may comprise at least two calibration transmitters, and preferably at least four.

Step b) may include iteratively using estimates corresponding to satellite ephemeris elements to obtain subsequent estimates of like kind. It may include calculating an ephemeris correction vector [A] from a product $[M]^{-1}[D]$, where [D] is a vector having elements which are differences between measured and estimated values of time difference and frequency difference for a set of measurement/estimation times and $[M]^{-1}$ is an inverse of a matrix [M] having elements which are changes to estimated satellite ephemeris elements for the set of measurement/estimation times, the changes resulting in [D] being reduced in magnitude compared to its value associated with estimated satellite ephemeris elements prior to the changes. The elements of [M] may be obtained by a least mean squares fit. The least mean squares fit may be based on a singular value decomposition. The elements of [D] and [M] may be weighted in proportion to associated inverses of measurement errors in time difference and frequency difference as appropriate.

The calibration transmitting means may comprise at least two calibration transmitters, preferably at least four.

The method may be applied to compensating for ephemeris errors of two satellites in the course of locating a transmitter causing satellite interference, ephemeris compensation being determined and applied to one satellite's ephemerides.

The method may alternatively be applied to compensating for ephemeris error for both a primary satellite and a secondary satellite and the calibration transmitting means may comprise at least ten calibration transmitters.

In an alternative aspect, the present invention provides an apparatus for compensating for or correcting satellite ephemeris error incorporating:—
  a) means for determining at least one of time difference and frequency difference associated with signal replicas received via different satellites from calibration transmitting means of known location; and
  b) means for obtaining estimates corresponding to satellite ephemeris elements and for calculating changes to such estimates giving rise to at least one of time difference and frequency difference estimations in closer conformity with corresponding measured time difference and/or frequency difference.

The means for determining at least one of time difference and frequency difference may be arranged to determine both time difference and frequency difference associated with the signal replicas. The calibration transmitting means may comprise at least two calibration transmitters, and preferably at least four.

The means for obtaining estimates corresponding to satellite ephemeris elements may be arranged for iteratively using estimates corresponding to satellite ephemeris elements to obtain subsequent estimates of like kind.

The means for obtaining estimates corresponding to satellite ephemeris elements may be arranged to calculate an ephemeris correction vector [A] from a product $[M]^{-1}[D]$, where [D] is a vector having elements which are differences between measured and estimated values of time difference and frequency difference for a set of measurement/estimation times and $[M]^{-1}$ is an inverse of a matrix [M] having elements which are changes to estimated satellite ephemeris elements for the set of measurement/estimation times, the changes resulting in [D] being reduced in magnitude compared to its value associated with estimated satellite ephemeris elements prior to the changes.

The means for obtaining estimates corresponding to satellite ephemeris elements may be arranged to obtain the elements of [M] by a least mean squares fit, which may itself be based on a singular value decomposition.

The means for obtaining estimates corresponding to satellite ephemeris elements may be arranged to weight the elements of [D] and [M] in proportion to associated inverses of measurement errors in time difference and frequency difference as appropriate.

The apparatus may be for compensating for ephemeris error of a single primary satellite and the calibration transmitting means may comprise at least two calibration transmitters, preferably at least four.

The apparatus may be for compensating for ephemeris errors of two satellites in the course of locating a transmitter causing satellite interference, the means for obtaining estimates corresponding to satellite ephemeris elements being arranged to determine ephemeris compensation and apply it to one satellite's ephemerides. It may be for compensating for ephemeris error for both a primary satellite and a secondary satellite and the calibration transmitting means may comprise at least ten calibration transmitters.

In a further aspect, the present invention provides computer software for use in compensating for or correcting satellite ephemeris error and comprising program code instructions recorded on an appropriate carrier medium for controlling computer apparatus to execute the steps of:
  a) determining at least one of time difference and frequency difference associated with signal replicas received via different satellites from calibration transmitting means of known location; and
  b) obtaining estimates corresponding to satellite ephemeris elements and calculating changes thereto giving rise to at least one of time difference and frequency difference estimations in closer conformity with corresponding measured time difference and/or frequency difference.

Step a) may comprise determining both time difference and frequency difference associated with the signal replicas. The calibration transmitting means may comprise at least two calibration transmitters, and preferably at least four.

Step b) may include iteratively using estimates corresponding to satellite ephemeris elements to obtain subsequent estimates of like kind. It may include calculating an ephemeris correction vector [A] from a product $[M]^{-1}[D]$, where [D] is a vector having elements which are differences between measured and estimated values of time difference and frequency difference for a set of measurement/estimation times and $[M]^{-1}$ is an inverse of a matrix [M] having elements which are changes to estimated satellite ephemeris elements for the set of measurement/estimation times, the changes resulting in [D] being reduced in magnitude compared to its value associated with estimated satellite ephemeris elements prior to the changes. The elements of [M] may be obtained by a least mean squares fit. The least mean squares fit may be based on a singular value decomposition. The elements of [D] and [M] may be weighted in proportion to associated inverses of measurement errors in time difference and frequency difference as appropriate.

The calibration transmitting means may comprise at least two calibration transmitters, and preferably at least four.

The software may be used in compensating for ephemeris errors of two satellites in the course of locating a transmitter causing satellite interference, ephemeris compensation being determined and applied to one satellite's ephemerides.

The software may alternatively be used in compensating for ephemeris error for both a primary satellite and a secondary satellite and the calibration transmitting means may comprise at least ten calibration transmitters.

In order that the invention might be more fully understood, embodiments thereof will now be described, by way of example only, with reference to the accompanying drawings, in which:
  FIG. 1 illustrates a prior art geolocation system;
  FIG. 2 shows Keplerian and Cartesian co-ordinate systems used to define satellite ephemeris parameters;
  FIG. 3 schematically illustrates a geolocation system of the invention;
  FIG. 4 is a flow diagram of steps in an iterative method of the invention in which successive sets of corrected ephemeris parameters are used to generate further such sets;
  FIG. 5 gives an example of locations of monitor, reference and calibration transmitters for use in the FIG. 3 system;

FIG. 6 illustrates improvement in geolocation generated in a simulation of the invention compensating for error in a single satellite ephemeris;

FIG. 7 gives an example of locations of monitor, reference and calibration transmitters for use in compensating for errors in ephemerides of two satellites;

Figure 5:
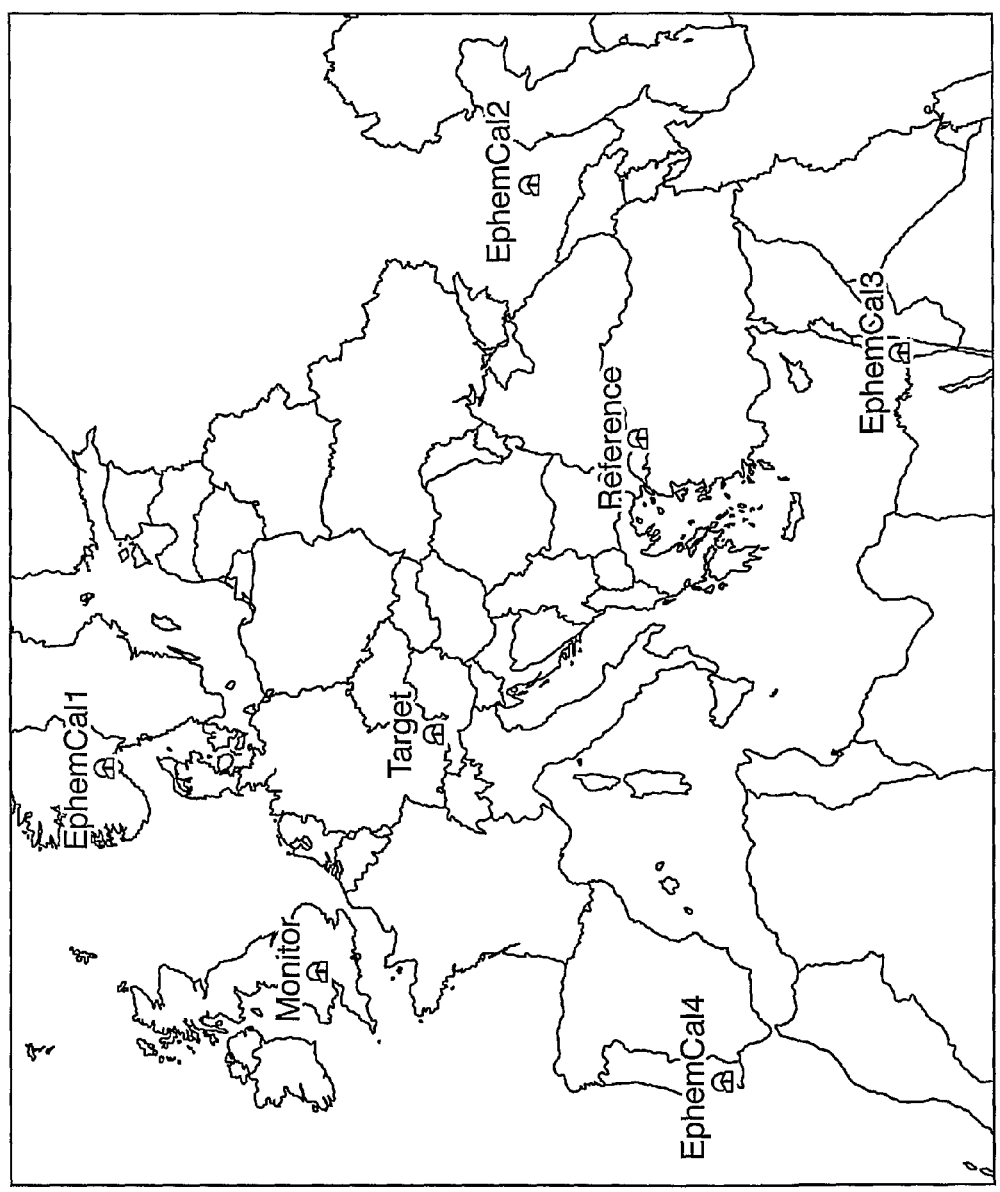

FIG. 1 illustrates a prior art geolocation system indicated generally by 10. It uses two satellites 12 and 14 monitored by respective receive antennas 16 and 18 to find the location of an unknown transmitter or target 20 causing interference to satellite communications. The transmitter 20 has a multi-lobed transmit radiation pattern of which a main lobe 22 and two side lobes 24 are shown. One satellite 12 receives radiation in the main lobe 22: it is designated the primary satellite and processing electronics (not shown) associated with its monitoring receive antenna 16 are designated the primary channel. The other satellite 14 receives radiation in the sidelobe 24: it is designated the secondary satellite and associated processing electronics at receive antenna 18 are designated the secondary channel. The primary and secondary channels produce signals for use in computation of signal correlation to determine DTO and DFO.

Both satellites 12 and 14 also receive a reference signal from a transmitter 26 at a known location and relay it to respective antennas 16 and 18. This reference signal is detected coherently with the target transmitter signal as described in U.S. Pat. No. 6,018,312: it enables removal of system biases such as imprecisely known translation frequencies of satellites' on-board local oscillators, and counteracts the effects of phase instabilities in those local oscillators on the correlation process. For the purposes of this specification, it is convenient to make a departure from practice in the prior art and treat DTO/DFO as different quantities to TDOA/FDOA. Thus TDOA and FDOA are defined herein by:

$$\text{TDOA} = \text{DTO}_T - \text{DTO}_R \text{ and } \text{FDOA} = \text{DFO}_T - \text{DFO}_R \quad (1)$$

where $\text{DTO}_T$ and $\text{DFO}_T$ are the target's DTO and DFO, and $\text{DTO}_R$ and $\text{DFO}_R$ are the reference DTO and DFO measured in each case as described in U.S. Pat. No. 6,018,312. TDOA and FDOA are therefore respectively reference-corrected equivalents of and differences between the target and reference DTO/DFO. These TDOA and FDOA parameters are dependent on satellite position: by knowing the positions and velocities of the satellites (i.e. the satellites' ephemerides) at the time of measurement of these parameters and the location of the reference 26, the location of the target transmitter 20 may be determined.

It is convenient but not essential for the purposes of this invention to employ TDOA and FDOA parameters as defined in Equation (1). Time difference and frequency difference values which are related to these parameters may be used so long as they are used consistently: e.g. such values might be offset to some extent from TDOA or FDOA if convenient. In the examples of the invention described below estimated values of TDOA and FDOA parameters are fitted to measured equivalents, and estimated related difference values could similarly be fitted to measured equivalents. The relationship to TDOA and FDOA needs to be taken into account when the related difference values are used for ephemeris determination or geolocation.

The format of an ephemeris depends on which co-ordinate system is used. FIG. 2 shows three co-ordinate systems at (a), (b) and (c). FIG. 2(a) shows Keplerian elements which are most commonly referred to where motion of an orbiting body is described with reference from the Earth's origin to a fixed point in space. More simply however, 3-dimensional Cartesian position and velocity vectors are used as shown in FIGS. 2(b) and 2(c). The two most common reference frames of this type are Earth Centred Inertial (ECI) and Earth Centred Fixed (ECF). The ECI frame has its origin at the centre of mass of the Earth but has a fixed inertial direction along an intersection of the Earth equatorial plane and the ecliptic plane (Vernal Equinox or First Point in Aries). The ECF frame has the same origin but is fixed in the Earth with its x-axis through the Greenwich meridian (at zero longitude). The ECF frame rotates in space once per sidereal day in line with the Earth's rotation. The invention is independent of which co-ordinate system is selected, but for the purposes of embodiments described herein ephemerides will be Cartesian-ECF in format.

Referring now to FIG. 3, the ephemeris error compensation or correction (EEC) technique of the invention is based on the two-satellite geolocation method used to measure TDOA and FDOA as described with reference to FIG. 1 using a coherent reference signal as in U.S. Pat. No. 6,018,312. As before, a target transmitter 30 directs a main lobe indicated by an arrow 32 at a primary satellite 34, which relays it at 35 to a primary intercept antenna 36. Here, to reduce illustrational complexity, only directions of transmitter main lobes or beams are shown in view of the increased number of transmitters, i.e. sidelobes are omitted.

A reference transmitter 38 at a known location provides a main beam indicated by a chain line 40 directed to the primary satellite 34 for relay at 45 to the primary monitoring antenna 36. Also shown are four ephemeris calibrator transmitters (ephemeris calibrators) 42a to 42d (collectively 42), two 42a/42b of which provide main beams indicated by respective lines 44a/44b directed to the primary satellite 34 for relay at 45 to the primary intercept antenna 36. The other two ephemeris calibrators 42c/42d provide main beams indicated by respective lines 44c/44d directed to a secondary satellite 46 for relay at 47 to a secondary monitoring antenna 48. The primary and secondary monitoring antennas 36 and 48 may be at different geographical sites, but in this example they are located at a single monitor site. It is noted in passing that it does not matter for the purposes of the invention whether a main beam of an ephemeris calibrator is directed to a primary or secondary satellite, as this does not affect ephemeris correction or compensation.

The ephemeris calibrators 42 and reference transmitter 38 all have accurately known locations, e.g. determined to Global Positioning System (GPS) accuracy or having latitude and longitude determined from another source. They have also been tested to give good correlations between signal replicas received via primary and secondary satellites, a basic feature of geolocation in accordance with U.S. Pat. No. 6,018,312. They are preferably geographically well separated: however, it is not essential to use multiple ephemeris calibrators at different sites; it is also possible to use one such calibrator and to make measurements at different times as will be described later.

It is assumed that initial estimates of the satellites' ephemerides are available, the accuracy of which will be described later. TDOA and FDOA location parameters are measured for each of the ephemeris calibrators 42 by treating each of them in turn as a target transmitter and using the method described with reference to FIG. 1 and in U.S. Pat. No. 6,018,312. Expected values for TDOA and FDOA for each of the ephemeris calibrators 42 are then calculated based on their known locations and using a priori ephemeris estimates of the positions and velocities of the primary and secondary satellites 34 and 46 (i.e. the satellites' ephemerides). The differences between the measured and calculated values for TDOA and FDOA are then obtained and an estimate of error in the satellites' ephemerides is calculated.

The method of the invention will first be outlined and then described in more detail later. An initial or starting set of ephemeris parameters (position and velocity vector elements) of the or each satellite ephemeris is obtained (as will be described later) at a convenient origin time $t_0$. This set is then adjusted or 'propagated' to give a respective ephemeris parameter set at a corresponding time of each TDOA and FDOA measurement separately: this is to allow for the fact that measurements or 'samples' are made at different times, and the measurement times correspond to different satellite ephemeris parameter sets because satellites move with time.

The propagated ephemeris parameter sets are then used to calculate expected values of TDOA and FDOA which correspond to respective measured values of TDOA and FDOA. Small changes are then made to the initial or starting set of ephemeris parameters, which are propagated as before and used to calculate new expected values of TDOA and FDOA. A "best fit" of parameter changes is produced which minimises differences between the calculated new expected values of TDOA and FDOA and the corresponding measured values.

If a large change in ephemeris is required, the ephemeris parameter changes calculated in this way may be insufficient: if so, the changes may be used to produce a corrected set of ephemeris parameters for use as a further starting set in an iterative process. In each iteration of this process, ephemeris changes are repeatedly calculated from corrected ephemeris parameters sets derived in respective immediately preceding iterations. Iteration proceeds until either significant changes cease to arise or a prearranged iteration number limit is reached.

Examples of the invention will now be described in more detail. For the purposes of an initial example of the invention, it is assumed that only the ephemeris of the primary satellite 34 is in error. An ephemeris for one satellite (at a given point in time referred to as an "epoch") can be represented as a 6×1 element column vector [S] containing the primary satellite's Cartesian-ECF position vector elements x, y, z and velocity vector elements $\dot{x}$, $\dot{y}$, $\dot{z}$. Here a superscript dot on $\dot{x}$, $\dot{y}$, $\dot{z}$ indicates derivative with respect to time. If an initial primary satellite ephemeris estimate or starting ephemeris is represented as a vector [SS] with elements $x_{SS}$ to $\dot{z}_{SS}$ and [A] is a column vector of corrections with elements $a_1$ to $a_6$ required to convert this starting ephemeris to a better estimate [S] of a true primary satellite ephemeris, [S] having elements $x_S$ to $\dot{z}_S$, then:

$$[S] = [SS] - [A] \quad (1)$$

or alternatively if written in full:

$$\begin{pmatrix} x_S \\ y_S \\ z_S \\ \dot{x}_S \\ \dot{y}_S \\ \dot{z}_S \end{pmatrix} = \begin{pmatrix} x_{SS} \\ y_{SS} \\ z_{SS} \\ \dot{x}_{SS} \\ \dot{y}_{SS} \\ \dot{z}_{SS} \end{pmatrix} - \begin{pmatrix} a_1 \\ a_2 \\ a_3 \\ a_4 \\ a_5 \\ a_6 \end{pmatrix} \quad (2)$$

The EEC technique of the invention determines (at least as an initial step) the elements $a_1$ to $a_6$ of the ephemeris correction vector [A]. In this embodiment of the invention, measurements of TDOA and FDOA are carried out on multiple geographically distributed ephemeris calibrators 42, each of known location, over a number N of time separated measurement samples. Each sample is a measurement of both TDOA and FDOA for a single ephemeris calibrator. This collection of N samples makes up a measurement campaign required to perform EEC. The samples are generally obtained (for convenience) in a number of measurement cycles, each cycle containing one sample for each ephemeris calibrator 42, taken in order. Thus the total number N of samples is given by the number of ephemeris calibrators 42, four in FIG. 3, multiplied by the number of cycles.

The invention is not limited to this embodiment's measurements of TDOA and FDOA. Measurements may be a combination of simultaneous measurements from different ephemeris calibrators and time-separated measurements from the same or other ephemeris calibrators. Simultaneous measurements may be obtained using multiple acquisition channels or sampling over a bandwidth sufficiently large to encompass multiple ephemeris calibrators.

In this embodiment, all samples are measured at different times (although that is not essential). The nth sample (n=1 to N) is measured at time $t_n$: for each sample, associated expected values $\langle TDOA \rangle_n$ and $\langle FDOA \rangle_n$ are calculated from initial start ephemerides of the primary and secondary satellites 36 and 48, and the locations of the reference transmitter 38, the primary and secondary intercept antennas 36 and 48, and the ephemeris calibrator 42 associated with the nth sample. This calculation is carried out as follows. Initial start ephemerides for satellites are publicly available (as described later). An ephemeris changes with time due to satellite motion, but having an initial start ephemeris at an origin time $t_0$, an ephemeris can be calculated for any other time from satellite orbital dynamics. A respective set of ephemeris parameters is therefore calculated for each sample measurement time $t_1$ to $t_N$ for the primary and secondary satellites 36 and 48. Using these calculated ephemeris parameters, expected TDOA/FDOA values $\langle TDOA \rangle_n$ and $\langle FDOA \rangle_n$ are calculated for each sample time $t_n$ (n=1 to N).

Measured TDOA/FDOA values $TDOA_n$ and $FDOA_n$ are obtained at each of the times $t_1$ to $t_N$ using the measurement technique described with reference to FIG. 3. The expected or calculated values $\langle TDOA \rangle_n$ and $\langle FDOA \rangle_n$ for all n from 1 to N are expressed as a vector and are then subtracted from a vector of the measured values $TDOA_n$ and $FDOA_n$ to give a column vector [D] of differences given by:

$$[D] = \Delta \begin{pmatrix} TDOA_1 \\ \vdots \\ TDOA_N \\ FDOA_1 \\ \vdots \\ FDOA_N \end{pmatrix} = \begin{pmatrix} TDOA_1 \\ \vdots \\ TDOA_N \\ FDOA_1 \\ \vdots \\ FDOA_N \end{pmatrix} - \begin{pmatrix} \langle TDOA \rangle_1 \\ \vdots \\ \langle TDOA \rangle_N \\ \langle FDOA \rangle_1 \\ \vdots \\ \langle FDOA \rangle_N \end{pmatrix} \quad (3)$$

where $\Delta$ indicates that the quantities $TDOA_1$ to $FDOA_N$ in parenthesis immediately following it are differences. The EEC technique of the invention aims to calculate changes to elements in initial satellite ephemerides which make the [D] vector as close as possible to the null vector which has all elements equal to zero.

To derive [A] in Equation (2) such that correcting [SS] by [A] gives expected location parameters which closely match measured location parameters, in this example the approach is to use small changes in the ephemeris elements in [SS] and determine their effect on values predicted for TDOA and FDOA. This is performed by calculating changes $\partial x$, $\partial y$, $\partial z$, $\partial \dot{x}$, $\partial \dot{y}$ and $\partial \dot{z}$ to respective ephemeris elements $x$, $y$, $z$, $\dot{x}$, $\dot{y}$ and $\dot{z}$. Here as before a superscript dot indicates a derivative with respect to time. The changes in the expected values of $\langle TDOA \rangle_n$ and $\langle FDOA \rangle_n$ associated with introducing $\partial x$ to $\partial \dot{z}$ are calculated for each sample at time $t_n$ ($n=1$ to $N$) respectively. This gives six changes of the form $$\frac{\partial TDOA(t_n)}{\partial k}$$

for each of the N values of $\langle TDOA \rangle_n$, and six changes of the form $$\frac{\partial FDOA(t_n)}{\partial k}$$

for each of the N values of $\langle FDOA \rangle_n$, where $k$ is $x$, $y$, $z$, $\dot{x}$, $\dot{y}$ or $\dot{z}$. The changes are arrived at using a fitting process which results in estimated values of TDOA and FDOA being a best fit to measured values of TDOA and FDOA. They are used as respective elements of a 2N×6 element matrix [M] of partial differentials. [M] is related to the differences matrix [D] in Equation (3) and the required ephemeris element changes column vector [A] in Equations (1) and (2) by:

$$[D]=[M][A] \quad (4)$$

or in full by:

$$[D] = \Delta \begin{pmatrix} TDOA_1 \\ \vdots \\ TDOA_N \\ FDOA_1 \\ \vdots \\ FDOA_N \end{pmatrix} = \begin{pmatrix} \frac{\partial TDOA(t_1)}{\partial x} & \cdots & \frac{\partial TDOA(t_1)}{\partial \dot{z}} \\ \vdots & \cdots & \vdots \\ \frac{\partial TDOA(t_N)}{\partial x} & \cdots & \frac{\partial TDOA(t_N)}{\partial \dot{z}} \\ \frac{\partial FDOA(t_1)}{\partial x} & \cdots & \frac{\partial FDOA(t_1)}{\partial \dot{z}} \\ \vdots & \cdots & \vdots \\ \frac{\partial FDOA(t_N)}{\partial x} & \cdots & \frac{\partial FDOA(t_N)}{\partial \dot{z}} \end{pmatrix} \cdot \begin{pmatrix} a_1 \\ a_2 \\ a_3 \\ a_4 \\ a_5 \\ a_6 \end{pmatrix} \quad (5)$$

Communications signals from the reference transmitter 38 and the ephemeris calibrators 42 differ in power: uncertainties in the measured TDOA and FDOA parameters for each sample are power dependent and will therefore differ. Equation (5) is weighted to reflect these uncertainties using their reciprocals as follows:

$$\Delta \begin{pmatrix} \frac{1}{\sigma_{\tau 1}} TDOA_1 \\ \vdots \\ \frac{1}{\sigma_{\tau N}} TDOA_N \\ \frac{1}{\sigma_{v 1}} FDOA_1 \\ \vdots \\ \frac{1}{\sigma_{v N}} FDOA_N \end{pmatrix} = \begin{pmatrix} \frac{1}{\sigma_{\tau 1}}\frac{\partial TDOA(t_1)}{\partial x} & \cdots & \frac{1}{\sigma_{\tau 1}}\frac{\partial TDOA(t_1)}{\partial \dot{z}} \\ \vdots & \cdots & \vdots \\ \frac{1}{\sigma_{\tau N}}\frac{\partial TDOA(t_N)}{\partial x} & \cdots & \frac{1}{\sigma_{\tau N}}\frac{\partial TDOA(t_N)}{\partial \dot{z}} \\ \frac{1}{\sigma_{v 1}}\frac{\partial FDOA(t_1)}{\partial x} & \cdots & \frac{1}{\sigma_{v 1}}\frac{\partial FDOA(t_1)}{\partial \dot{z}} \\ \vdots & \cdots & \vdots \\ \frac{1}{\sigma_{v N}}\frac{\partial FDOA(t_N)}{\partial x} & \cdots & \frac{1}{\sigma_{v N}}\frac{\partial FDOA(t_N)}{\partial \dot{z}} \end{pmatrix} \cdot \begin{pmatrix} a_1 \\ a_2 \\ a_3 \\ a_4 \\ a_5 \\ a_6 \end{pmatrix} \quad (6)$$

where $\sigma_{\tau n}$ and $\sigma_{v n}$ ($n=1$ to $N$) are uncertainties in the measured TDOA and FDOA values respectively for the nth sample.

Rearranging Equation (6) by premultiplying both sides by $[M]^{-1}$ and replacing the product $[M]^{-1}[M]$ by an identity matrix, the error vector [A] in the starting ephemeris is given by:

$$[A]=[M]^{-1}[D] \quad (7)$$

where $[M]^{-1}$ is the unique Moore-Penrose generalised inverse of [M], Penrose R, 1955, Proceedings of the Cambridge Philosophical Society, 51, 406-413, "A generalized inverse for matrices". Equation (7) is a linear relation between the error vector [A], small changes in the ephemeris elements and TDOA/FDOA estimated/measured differences. The satellite ephemeris may however be in error by an amount significantly different to the small changes used to populate [M], and the linear relation of Equation (7) may no longer be satisfactory. If this is the case, an iterative approach may be used to find ephemeris errors. A first computation of [A] is made and used in Equation (1) to generate a new estimate [S] of the ephemeris. This computation is then iterated using the new estimate [S] of the ephemeris as the starting ephemeris. The changes used to populate [M] are adjusted automatically in each iteration to correspond better to adjustments made to [S] in the respective preceding iteration. For well-behaved scenarios the results have been found to converge satisfactorily after three to five iterations.

If the ephemerides of both satellites 34 and 46 are in error, ephemeris error correction for a single satellite in accordance with the invention cannot be relied on to solve for both satellites' positions and velocities. However, it has been found that single satellite ephemeris error correction in accordance with the invention can in many circumstances provide a change in the ephemeris of one satellite that counteracts geolocation error attributable to errors in both satellites' ephemerides. Strictly speaking this is ephemeris compensation to reduce geolocation error as opposed to correction of ephemeris error per se. Consequently, and despite corrected ephemerides for both satellites not being obtained, greatly improved geolocation accuracy for a ground based transmitter causing satellite interference is normally obtained by this technique, which is an important result in its own right.

The invention may be used to improve geolocation performance using two satellites in three scenarios:
- single satellite ephemeris correction where the other satellite ephemeris is accurate,
- single satellite ephemeris correction where the other satellite ephemeris is inaccurate (i.e. ephemeris compensation), and
- two satellite ephemeris correction.

To correct ephemerides errors for two satellites 34 and 46, it is possible to expand Equation (5) to enable these errors to be calculated together. This allows both satellites' ephemerides to be determined. Expanding Equation (6) for errors in two satellites' ephemerides gives:

$$[D] = \Delta \begin{pmatrix} TDOA_1 \\ \vdots \\ TDOA_N \\ FDOA_1 \\ \vdots \\ FDOA_N \end{pmatrix} = \tag{8}$$

$$\begin{pmatrix} \frac{\partial TDOA(t_1)'}{\partial x} & \cdots & \frac{\partial TDOA(t_1)}{\partial \dot{z}} & \frac{\partial TDOA(t_1)}{\partial x'} & \cdots & \frac{\partial TDOA(t_1)}{\partial \dot{z}'} \\ \vdots & \cdots & \vdots & \vdots & \cdots & \vdots \\ \frac{\partial TDOA(t_N)}{\partial x} & \cdots & \frac{\partial TDOA(t_N)}{\partial \dot{z}} & \frac{\partial TDOA(t_N)}{\partial x'} & \cdots & \frac{\partial TDOA(t_N)}{\partial \dot{z}'} \\ \frac{\partial FDOA(t_1)}{\partial x} & \cdots & \frac{\partial FDOA(t_1)}{\partial \dot{z}} & \frac{\partial FDOA(t_1)}{\partial x'} & \cdots & \vdots \\ \vdots & \cdots & \vdots & \vdots & \cdots & \vdots \\ \frac{\partial FDOA(t_N)}{\partial x} & \cdots & \frac{\partial FDOA(t_N)}{\partial \dot{z}} & \frac{\partial FDOA(t_N)}{\partial x'} & \cdots & \frac{\partial FDOA(t_N)}{\partial \dot{z}'} \end{pmatrix} \cdot \begin{pmatrix} a_1 \\ \vdots \\ a_6 \\ a'_1 \\ \vdots \\ a'_6 \end{pmatrix}$$

where small changes in ephemeris elements of the primary and secondary satellites 34 and 46 are denoted by ($\partial x, \partial y, \partial z, \partial \dot{x}, \partial \dot{y}, \partial \dot{z}$) and primed equivalents ($\partial x', \partial y', \partial z', \partial \dot{x}', \partial \dot{y}', \partial \dot{z}'$) respectively. Likewise, corrections to be calculated for the ephemeris elements of the primary and secondary satellites 34 and 46 are denoted by ($a_1$ to $a_6$) and ($a'_1$ $a'_6$) respectively. If weights are included in Equation (8) as described in connection with Equations (5) and (6), then:

$$\Delta \begin{pmatrix} \frac{1}{\sigma\tau_1} TDOA_1 \\ \vdots \\ \frac{1}{\sigma\tau_N} TDOA_N \\ \frac{1}{\sigma v_1} FDOA_1 \\ \vdots \\ \frac{1}{\sigma v_N} FDOA_N \end{pmatrix} = \tag{9}$$

$$\begin{pmatrix} \frac{1}{\sigma\tau_1}\frac{\partial TDOA(t_1)}{\partial x} & \cdots & \frac{1}{\sigma\tau_1}\frac{\partial TDOA(t_1)}{\partial \dot{z}} & \frac{1}{\sigma\tau_1}\frac{\partial TDOA(t_1)}{\partial x'} & \cdots & \frac{1}{\sigma\tau_1}\frac{\partial TDOA(t_1)}{\partial \dot{z}'} \\ \vdots & \cdots & \vdots & \vdots & \cdots & \vdots \\ \frac{1}{\sigma\tau_N}\frac{\partial TDOA(t_N)}{\partial x} & \cdots & \frac{1}{\sigma\tau_N}\frac{\partial TDOA(t_N)}{\partial \dot{z}} & \frac{1}{\sigma\tau_N}\frac{\partial TDOA(t_N)}{\partial x'} & \cdots & \frac{1}{\sigma\tau_N}\frac{\partial TDOA(t_N)}{\partial \dot{z}'} \\ \frac{1}{\sigma v_1}\frac{\partial FDOA(t_1)}{\partial x} & \cdots & \frac{1}{\sigma v_1}\frac{\partial FDOA(t_1)}{\partial \dot{z}} & \frac{1}{\sigma v_1}\frac{\partial FDOA(t_1)}{\partial x'} & \cdots & \frac{1}{\sigma v_1}\frac{\partial FDOA(t_1)}{\partial \dot{z}'} \\ \vdots & \cdots & \vdots & \vdots & \cdots & \vdots \\ \frac{1}{\sigma v_N}\frac{\partial FDOA(t_N)}{\partial x} & \cdots & \frac{1}{\sigma v_N}\frac{\partial FDOA(t_N)}{\partial \dot{z}} & \frac{1}{\sigma v_N}\frac{\partial FDOA(t_N)}{\partial x'} & \cdots & \frac{1}{\sigma v_N}\frac{\partial FDOA(t_N)}{\partial \dot{z}'} \end{pmatrix} \cdot \begin{pmatrix} a_1 \\ \vdots \\ a_6 \\ a'_1 \\ \vdots \\ a'_6 \end{pmatrix}$$

Equation (9) is more likely to reflect the true dynamics of two satellites 34 and 46 than the single satellite equivalent described earlier, but it uses a larger number (N) of ephemeris calibrators and samples in a calibration campaign as there are now more parameters to be determined.

Referring now to FIG. 4, there is shown a flow diagram of the procedure described above which is computer-implemented. At 60, an iteration number p is defined and set initially to 1, and then a starting set of ephemeris parameters ("Start Eph"), or two starting sets of ephemeris parameters if the ephemerides of both satellites are to be corrected, is/are read at 62 from a starting ephemeris maintenance stage 64. For convenience the expression "starting ephemeris" in this embodiment shall be deemed to include one or two sets of ephemeris parameters as appropriate to context. The stage 64 has an initial starting ephemeris which is the first current starting ephemeris at origin time $t_0$, and each current starting ephemeris is updated iteratively to form the next current starting ephemeris from time to time as will be described later. At 66 the starting ephemeris for time $t_0$ is converted to a respective starting ephemeris for sample n (n=1 to N) at time $t_n$ and the resulting ephemerides are used as a basis for calculating expected TDOA/FDOA values $\langle TDOA \rangle_n$ and $\langle FDOA \rangle_n$ for all samples (n=1 to N). This calculation is as described earlier for the single satellite ephemeris correction case. At 68, the estimates $\langle TDOA \rangle_n$ and $\langle FDOA \rangle_n$ for time $t_n$ are subtracted from respective TDOA/FDOA values measured at time $t_n$ using the technique described with reference to FIG. 3. Weighting with reciprocals of uncertainties is then applied to give the left hand side of Equation (6).

An ephemeris element iteration number q is defined at 70 and set initially to 1. At 72 a small change $\partial param_q$ is made to the qth ephemeris parameter, where $param_q$ is $\partial x$, $\partial y$, $\partial z$, $\partial \dot{x}$, $\partial \dot{y}$ or $\partial \dot{z}$ for one satellite and for two satellites $\partial x$, $\partial y$, $\partial z$, $\partial \dot{x}$, $\partial \dot{y}$ or $\partial \dot{z}$ together with primed equivalents ($\partial x'$,$\partial y'$,$\partial z'$,$\partial \dot{x}'$,$\partial \dot{y}'$, $\partial \dot{z}'$). For the first of these parameters, i.e. x, q=1 and the small change is $\partial x$. The effect of the small change $\partial param_q$ on $\langle TDOA \rangle_n$ and $\langle FDOA \rangle_n$ is then calculated at 74 for all N samples; i.e. differentials $$\frac{\partial \langle TDOA \rangle_n}{\partial param_q}$$

and $$\frac{\partial \langle FDOA \rangle_n}{\partial param_q}$$

are calculated for all n=1 to N. The objective is to find a set of values of $\partial param_q$ which changes $\langle TDOA \rangle_n$ and $\langle FDOA \rangle_n$ to make them as nearly as possible equal to the measured values of $TDOA_n$ and $FDOA_n$ respectively at time $t_n$, making the difference vector [D] as small as possible. This mathematical process is well known and will not be described: it is a least mean squares fit (using for example singular value decomposition) taken from 'Numerical Recipes in C—The Art of Scientific Computing', 1988, Cambridge University Press, W.H. Press, B. P. Flannery, S. A. Teukolsky and W. T. Vetterling, chapter 14, page 528. Data for this fit are incorporated in the vector [D] comprising differences between measured and estimated values of TDOA and FDOA. A model is fitted which is given by 6 or 12 ephemeris parameter partial differentials, evaluated at each sample time $t_n$. An optimum combination of changes to the current starting ephemeris parameters is obtained which minimises (in a least squares sense) differences between estimated and measured values of TDOA and FDOA.

Weighting is then applied to the differentials, as shown in Equation (6) (one satellite) or Equation (9) (two satellites), and the resulting values are used at 76 to populate the qth column of the matrix [M].

An ephemeris element iteration count is now made at 78, where (1) indicates consideration of one satellite ephemeris and (2) indicates two such. For one satellite, [M] has six columns and q goes from 1 to 6; for two satellites, [M] has twelve columns and q goes from 1 to 12. For the one satellite case, if q<6, or for the two satellite case, if q<12, the sequence 72 to 78 iterates via a loop 80 with the ephemeris element iteration number q being incremented by one at 82 for each iteration. If q=6 (one satellite) or 12 (two satellites), processing passes to a stage 84.

At 84, the Moore-Penrose inverse $[M]^{-1}$ of the weighted matrix [M] is calculated and used to multiply [D] to obtain the ephemeris correction vector [A] as in Equation (7). [A] is passed to the starting ephemeris maintenance stage 64, where the current starting ephemeris is updated or corrected to convert it to a better estimate of a true primary satellite ephemeris in accordance with Equations (1) and (2). This better estimate is then available to be read in stage 62 for use in a subsequent iteration (if any). At 86 a test is made to see if the starting ephemeris has converged, the criterion in this regard being that the current starting ephemeris immediately prior to the most recent update and the updated equivalent differ only to an insignificant extent. If this criterion is met, processing ends at 88; if not, there is a second end point criterion, i.e. that the iteration number p is equal to a prearranged limit pmax. If neither of these criteria is met, iteration continues via a loop 92, the iteration number p is incremented by 1 at 94, and processing returns to the Read Start Ephemeris stage 62: at 62 the most recently updated or corrected version of the start ephemeris is read from 64 and stages 66 onwards are iterated. An alternative criterion is that the residual error in TDOA and FDOA had reduced to an acceptable level, e.g. less than measurement error.

To examine the effectiveness of the invention in connection with geolocation accuracy, simulations were made. A number of cycles of ephemeris calibrator data (TDOA and FDOA parameters) were simulated using satellite ephemerides that had been defined as 'true' ephemerides for the purposes of the simulations. As has been said one cycle of data refers to a respective TDOA measurement and a respective FDOA measurement (simulated or actual) for each of the ephemeris calibrators 42 in turn. The simulated measurements included realistic Gaussian errors. Initial starting ephemerides which were in error from the defined true ephemerides were then used as a priori estimates of the satellites' orbital dynamics. FIG. 5 is a map of Europe, North Africa and the Middle East showing geographical transmitter locations used for the simulations depicted as icons. It shows four ephemeris calibrators (EphemCal 1 to 4) at Oslo, Norway, a location near Urozhaynoye in southern Russia, Rehevot, Israel and Lisbon, Portugal, a reference transmitter (Reference) at Bursa, Turkey, a target transmitter (Target) near Worgl in Austria and a monitor station (Monitor) having two intercept antennas (not shown) at Defford, England.

The calibration campaign consisted of simulating samples from the four ephemeris calibrators shown in FIG. 5. Three measurement cycles with respective start times separated by 1 minute were simulated. For the purposes of the simulations, each measurement within any given cycle was assumed for convenience to occur at the same time, as calculating ephemerides for different measurement times adds nothing. Errors in the initial starting ephemerides were then corrected using the one-satellite EEC technique of the invention described previously to give a correction to the primary satellite's ephemeris.

Figure 6:
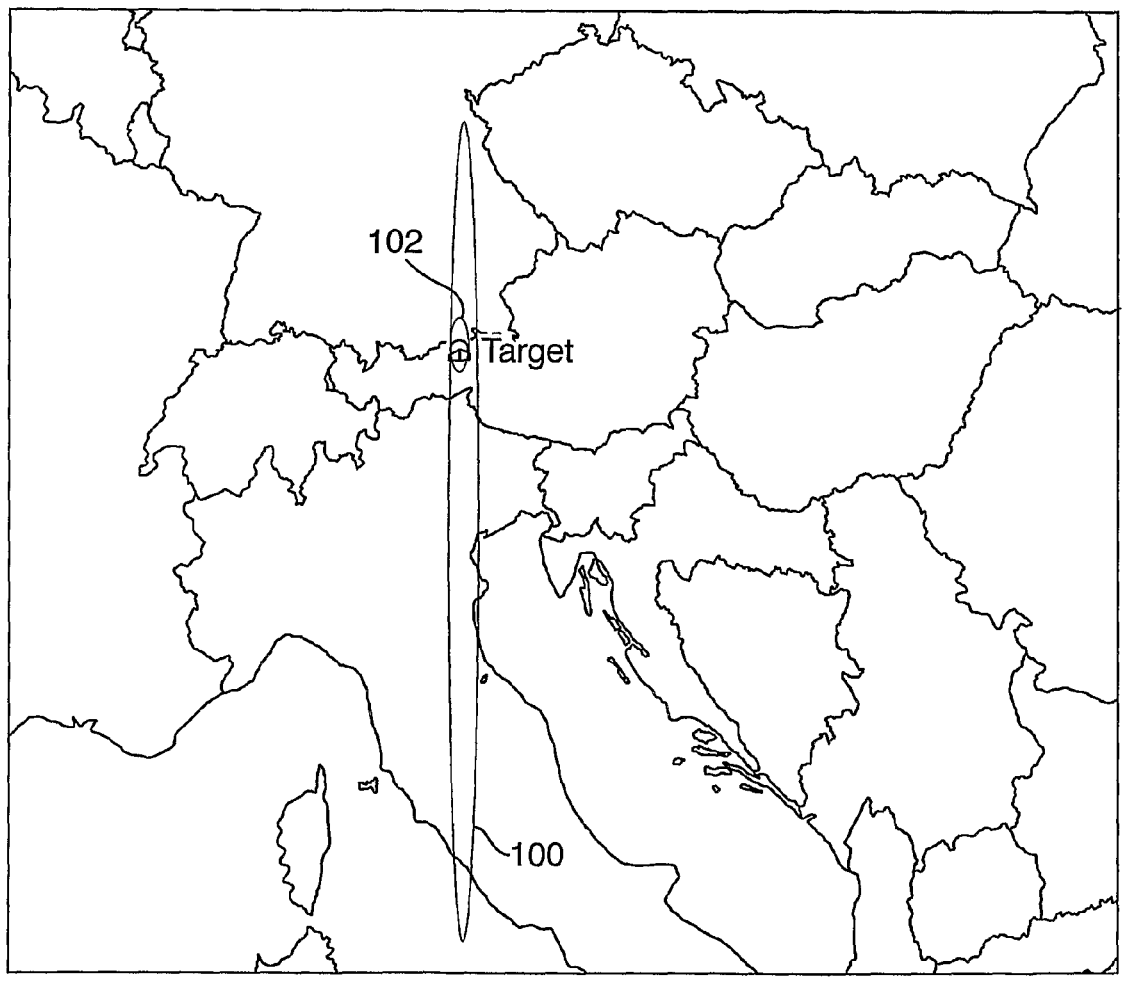

To determine the invention's effect on geolocation accuracy, the TDOA and FDOA of a sample transmission from the Target at its position shown in FIG. 5 were also simulated based on the defined true ephemerides. This sample of the Target transmitter was simulated as having been taken one minute after the end of the calibration campaign. Two ground position estimates were made of the target position, one derived using the initial starting satellite ephemerides and the other based on the corrected primary ephemeris (and initial starting secondary ephemeris). These location estimates are shown in FIG. 6.

A first location ellipse 100 was calculated from the initial starting satellite ephemerides: it is approximately 990 km in length and expresses a confidence level of 95%, i.e. the probability of the Target being located within it is 95%. Calculation of the location ellipse 100 takes into account ephemeris error. A second location ellipse 102 was calculated using the corrected ephemerides: it is only 25 km in length (nearly fortyfold improvement), as almost all ephemeris error has been eliminated leaving only TDOA/FDOA measurement error. It is also important to note that the first ellipse 100 is by no means a worst case. The initial starting satellite ephemerides can be so greatly in error that there is no location ellipse on the surface of the Earth. In these instances the gains in geolocation accuracy obtained with the aid of the invention are clearly larger than indicated by FIG. 6, but the gains cannot be quantified in the absence of a comparison ellipse.

The location ellipses 100 and 102 may be calculated from TDOA and FDOA errors attributable to ephemeris errors and TDOA and FDOA measurement errors, and to combine the two by square root of sum of squares. In this example of the invention, a location ellipse is a boundary indicating 95% confidence limits based on the combined errors.

Figure 7:
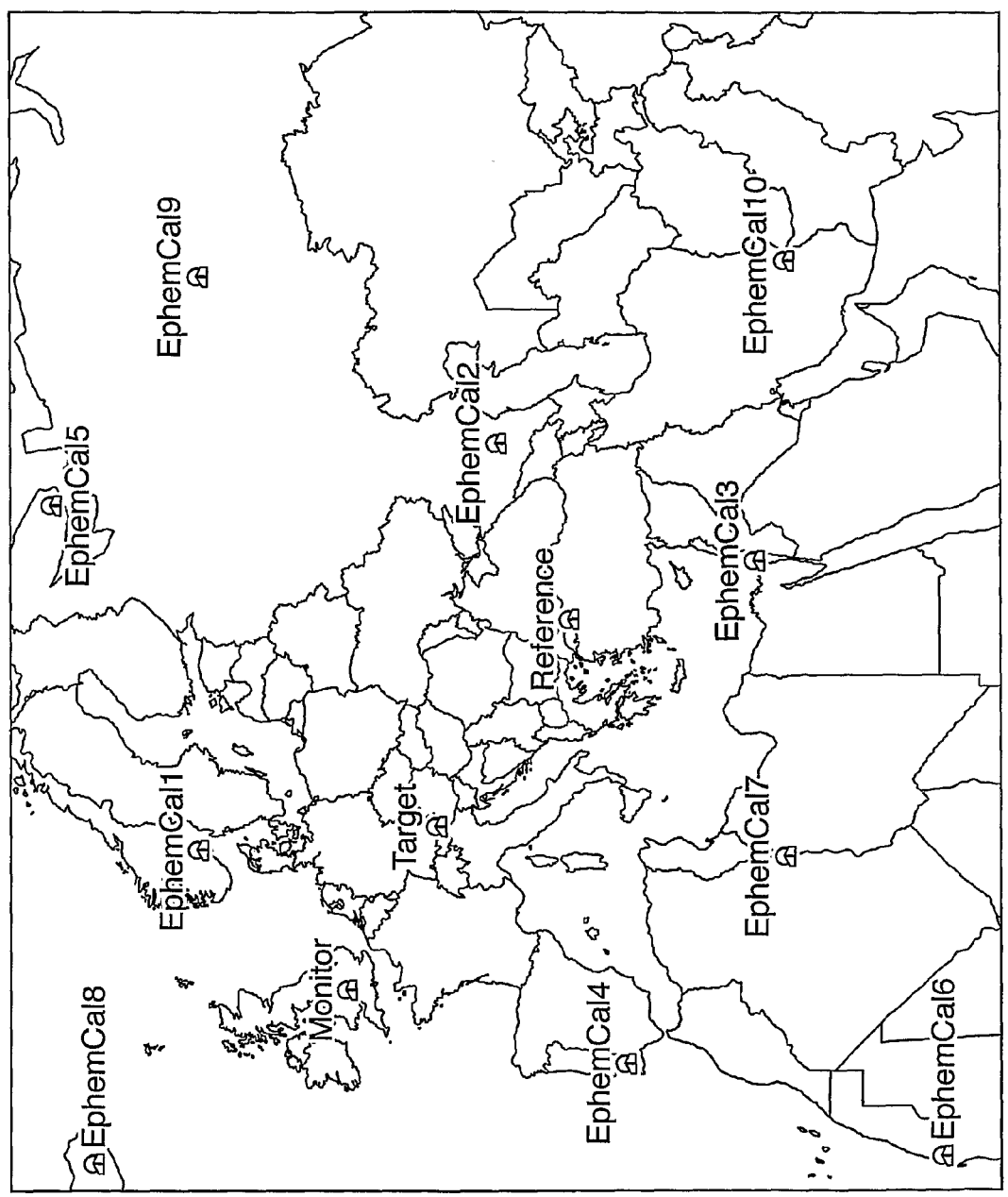

In a further embodiment of the invention, two satellites' ephemerides are calculated simultaneously. FIG. 7 shows locations of satellite ground stations used for this embodiment: Monitor, Reference and Target transmitters and ephemeris calibrators EphemCal 1 to 4 were located as described earlier with reference to FIG. 5. Because two satellites' ephemerides were involved, an additional six ephemeris calibrators EphemCal 5 to EphemCal 10 were employed at locations given in Table 1 below. Five of the ephemeris calibrators EphemCal 1 to 5 were directed to the primary satellite 34 in FIG. 3, and the other five EphemCal 6 to 10 were directed to the secondary satellite 46 (although it does not matter which satellite is designated primary and which secondary).

TABLE 1

| Ephemeris Calibrator Reference | Location |
| --- | --- |
| EphemCal 5 | NW Russia |
| EphemCal 6 | Western Sahara |
| EphemCal 7 | East Algeria |
| EphemCal 8 | Iceland |
| EphemCal 9 | Central Russia |
| EphemCal 10 | Eastern Iran |

Simulations were made of 72 cycles with respective start times separated by 5 minutes (i.e. spanning 6 hours). Errors in initial starting ephemerides were then corrected using the two-satellite EEC technique described above with reference to FIG. 4, to give an estimate of true ephemerides.

To solve a mathematical problem with twelve unknowns (2×6 ephemeris elements), in theory a minimum of twelve measurements, e.g. six FDOA and six TDOA measurements, should be required. These measurements might be made using N spatially separated EphemCals and (12−N) temporally separated measurements, where N is any integer in the range 1 to 12: i.e. any combination of spatially and temporally separated measurements may be used, including all of either and none of the other. However, results are affected by scenario, noise and reliability of initial or starting ephemeris: here "scenario" means satellite positions and velocities, geographical locations of relevant transmitters and receivers, and strength of correlations between signal replicas received via primary and secondary satellites in the technique described with reference to FIG. 1. In practical circumstances therefore, more measurements may be required, e.g. several cycles of four or five EphemCals: moreover, using more cycles makes results more constrained and robust.

Figure 8:
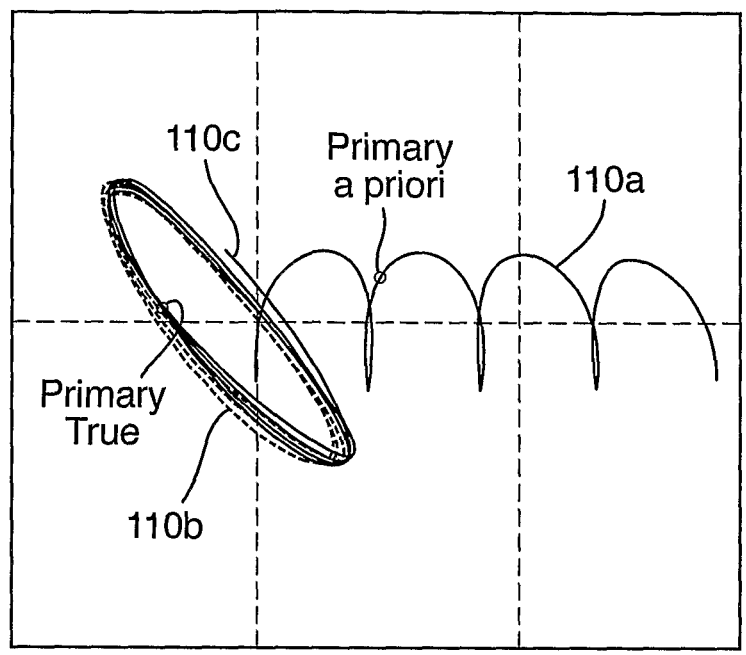
FIG. 8 shows satellite ground tracks for a primary satellite in FIG. 3 and derived from a) initial starting ephemeris, b) true satellite ephemeris and c) ephemeris calculated in accordance with the invention.

Referring now to FIG. 8, there are shown satellite ground tracks 110a, 110b (dotted line) and 110c (solid line) for the primary satellite (propagated over four days) derived from a) initial starting ephemeris (i.e. a priori or pre-correction), b) true satellite ephemeris and c) ephemeris calculated from the initial starting ephemeris in accordance with the invention. A ground track is a series of points on the Earth's surface directly below a satellite over a period of time. Tracks 110b (true) and 110c (calculated) are virtually coincident, indicating that ephemeris corrected in accordance with the invention gives a good estimate of true satellite ephemeris. These true and calculated tracks are difficult to resolve due to near identical satellite orbital dynamics in the two cases. The initial starting (a priori) satellite ephemeris for track 110a is considered to be a worst case scenario in which the only data available regarding the satellites' orbital dynamics are nominal longitude and the fact that orbits are (approximately) geostationary. These data are used to calculate Cartesian-ECF ephemerides at a specified epoch. It is unlikely that at least this basic information would not be available: reasonably accurate starting ephemerides can be found from comprehensive web site listings (see e.g. www.celestrak.com) of the North American Aerospace Defense Command (NORAD), which provide an ephemeris type referred to as "Two Line Element".

Figure 9:
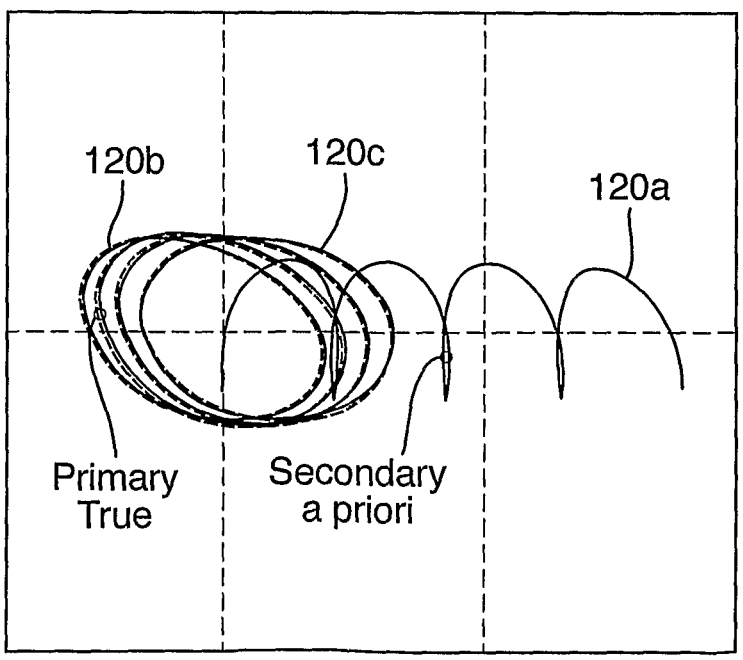
FIG. 9 is equivalent to FIG. 8 except that it applies to a secondary satellite.

Referring now to FIG. 9, this is equivalent to FIG. 8 except that it applies to the secondary satellite. It shows satellite ground tracks 120a, 120b (dotted line) and 120c (solid line) derived from a) initial starting (a priori or pre-correction) ephemerides, b) true satellite ephemerides and c) ephemerides calculated in accordance with the invention. Here again, tracks 120b (true) and 120c (calculated) are virtually coincident, indicating that the calculated ephemeris is a good estimate of true satellite ephemeris.

Table 2 below lists initial starting (a priori) ephemeris elements, ephemeris elements calculated in accordance with the invention and true ephemeris elements. Also shown are absolute differences between calculated and true ephemeris elements for which the data was simulated. In ephemeris element x, the difference is less than 1 part in a million. Ephemeris elements calculated in accordance with the invention were in error by less than 200 m in any one position co-ordinate and less than 230 m rms in the resultant of position coordinates. Moreover, the velocity error is no more than 0.04 m/s: these errors were for a satellite at an orbital altitude of approximately 35,800 km above the Earth's surface (42, 164 km from the centre of the Earth to geosynchronous orbit).

The satellite velocity was up to 3 m/s (in the ECF co-ordinate system or up to 3 km/s in the ECI co-ordinate system). A difference position vector between the true and calculated ephemerides had a magnitude which was never more than 600 m for both the primary and secondary satellites over 24 hours for which the ephemerides were propagated and remained less than 900 m over a subsequent 48-hour period. These values were typical of those obtained over a number of measurement campaigns.

a) Ephemeris error compensation (i.e. single satellite correction): 72 measurement sets of TDOA and FDOA on two ephemeris calibrators with each measurement set separated by 5 mins (i.e. 6 hours in total) give an rms position error of 56 m and an rms velocity error of $4\times10^{-3}$ m/s for a TDOA measurement error of $10^{-7}$ s and an FDOA measurement error of $10^{-3}$ Hz.

b) Ephemeris error correction (i.e. two satellite correction): 72 measurements of TDOA and FDOA on four ephem-

TABLE 2

|  | Epoch | Position (m) | | | Velocity (m/s) | | |
| --- | --- | --- | --- | --- | --- | --- | --- |
|  |  | x | y | z | $\dot{x}$ | $\dot{y}$ | $\dot{z}$ |
| Primary_ a priori | 18 Feb. 2003 00:00:00.00 | 41849883.102 | 5138519.520 | −10133.901 | 0.000 | 0.000 | −0.425 |
| Primary_ Calculated | 18 Feb. 2003 00:00:00.00 | 41867976.028 | 5129386.405 | 9531.83 | 0.141 | −2.336 | 1.350 |
| Primary_ True | 18 Feb. 2003 00:00:00.00 | 41867949.197 | 5129580.591 | 9426.557 | 0.140 | −2.335 | 1.316 |
| Difference (Calc- True) |  | 26.831 | −194.186 | 105.273 | 0.001 | −0.001 | 0.034 |
| Secondary_ a priori | 18 Feb. 2003 00:00:00.00 | 41523599.889 | 7321730.997 | −10422.341 | 0.000 | 0.000 | −0.386 |
| Secondary_ Calculated | 18 Feb. 2003 00:00:00.00 | 41539803.045 | 7335741.122 | −14431.224 | 0.267 | −2.528 | 0.141 |
| Secondary_ True | 18 Feb. 2003 00:00:00.00 | 41539768.631 | 7335928.288 | −14536.898 | 0.266 | −2.527 | 0.175 |
| Difference (Calc − True) |  | 34.414 | −187.166 | 105.674 | 0.001 | −0.001 | −0.034 |

In the EEC technique of the invention, the physical number of EphemCal stations is less important than the number of EphemCal measurements. EEC could be performed using only one EphemCal station, and sampling every 10 mins for e.g. 6 hours to give thirty-six TDOA and FDOA measurements. This is not ideal but it could still give useable ephemeris parameter results in sufficiently good measurement circumstances. Use of more than one EphemCal station is likely to improve results compared to use of one such station. Moreover, if an initial or starting ephemeris is used which is very accurate, then the EEC technique of the invention is less likely either to fail to converge or to converge upon an incorrect solution. An incorrect solution may be indicated by TDOA and/or FDOA residuals being obtained which are outside expected error bounds. Moreover, with a very accurate starting ephemeris, only a few measurements may be required for convergence: the converse of this is also true. As mentioned earlier, in the examples of the invention described above, each EphemCal measurement gives two measured quantities, TDOA and FDOA: consequently, to solve for six or twelve unknowns in the ephemeris requires respectively a minimum of three or six EphemCal measurements, i.e. the number of measured quantities combined should at least equal the number of unknowns. However, in practice, this may not be sufficient in adverse measurement conditions. Moreover, three measurements of a single EphemCal taken at one minute intervals are likely to be much less effective than three measurements from three different geographically separated EphemCals, or from one EphemCal with much larger measurement intervals e.g. two hours. Results tend to improve if EphemCal measurements are well separated in at least one of spatial and temporal dimensions. Experience indicates that reasonable results may be achievable in a short time using four or more geographically well separated EphemCal stations, but four is not a minimum.

Simulations of the invention have been carried out using a combination of TDOA and FDOA. Results were obtained as follows:

eris calibrators with each measurement set separated by 10 mins (i.e. 12 hours in total) give rms position errors of about 700 m and rms velocity errors of about 0.50 m/s for a TDOA measurement error of $10^{-7}$ s and an FDOA measurement error of $10^{-3}$ Hz.

Simulations of the invention were also carried out for one satellite compensation and two satellite correction using one type of measurement data only, i.e. either TDOA data or FDOA data but not both: the purpose was to determine the viability of these two alternative approaches. The performance of these compensation and correction functions using TDOA-only or FDOA-only data depends on a number of factors, data accuracy, number of calibrators or EphemCal stations and number of measurements in addition to scenario.

One satellite compensation simulation was performed using 'TDOA-only' and 'FDOA-only' data with results set out below in Tables 3A and 3B respectively. Here and in subsequent tables "N_Sites" means the number of calibrators or EphemCal stations, "Inc_min" means the number of minutes between successive measurements, "N_count" means the number of measurements and No Convergence means it was not possible to carry out compensation.

TABLE 3A

Compensation Using TDOA-only data
TDOA error $10^{-7}$ seconds, FDOA error 1 Hz, Inc_min = 5, N_count = 72

| N_sites | Rms position error (m) | Rms velocity error (m/s) |
| --- | --- | --- |
| 1 | No convergence | No convergence |
| 2 | 296 | 0.00782 |
| 3 | 133 | 0.0137 |
| 4 | 190 | 0.0167 |
| 5 | 25 | 0.0129 |
| 6 | 441 | 0.0447 |
| 7 | 343 | 0.0346 |
| 8 | 524 | 0.0512 |

TABLE 3A-continued

Compensation Using TDOA-only data
TDOA error $10^{-7}$ seconds, FDOA error 1 Hz, Inc_min = 5, N_count = 72

| N_sites | Rms position error (m) | Rms velocity error (m/s) |
|---|---|---|
| 9 | 600 | 0.0593 |
| 10 | 635 | 0.0636 |

TABLE 3B

Compensation Using FDOA-only data
TDOA error $10^{-2}$ seconds, FDOA error $10^{-3}$ Hz,
Inc_min = 5, N_count = 72

| N_sites | Rms position error (m) | Rms velocity error (m/s) |
|---|---|---|
| 1 | Large | Large |
| 2 | 109000 | 7.97 |
| 3 | 3870 | 0.282 |
| 4 | 1500 | 0.11 |
| 5 | 1460 | 0.107 |
| 6 | 681 | 0.0496 |
| 7 | 725 | 0.0529 |
| 8 | 956 | 0.0697 |
| 9 | 1080 | 0.0789 |
| 10 | 1140 | 0.0829 |

The data in Tables 3A and 3B was obtained using from 1 to 10 calibrators (N_Sites=1 to 10) as indicated in the left hand column. It showed that a single type of measurement (i.e. TDOA or FDOA but not both) could be used for one satellite compensation. The errors are 'realistic' values, i.e. the sort of error values experienced in current practice.

Two satellite correction simulation was performed using very accurate 'TDOA-only" data with results set out below in Table 4.

TABLE 4

Inc_min = 20, N_count = 72, TDOA error = $10^{-12}$ s, FDOA error = 1 Hz

| N_Sites | Rms position error (m) | Rms velocity error (m/s) |
|---|---|---|
| 1 | 88,600 | 5.85 |
| 2 | 167,000 | 71.3 |
| 3 | 4,680 | 0.00966 |
| 4 | 1.56 | $2 \times 10^{-5}$ |
| 5 | 1.64 | $2 \times 10^{-5}$ |

Table 4 shows that even using very accurate TDOA-only measurements (error=$10^{-12}$ s) the rms (root mean square) position error is large if only one or two calibrators are used: three and preferably four calibrators are desirable. If three calibrators are used, the position error may be high, but the velocity error may be acceptable. If four calibrators are used, position and velocity errors are reduced by more than two orders of magnitude compared to equivalent errors for three calibrators. Adding a fifth calibrator makes little difference.

Two satellite correction simulation was performed using realistic accuracy 'TDOA-only" data (error=$10^{-7}$ s) with results set out below in Table 5.

TABLE 5

Inc_min = 20, N_count = 72, TDOA error = $10^{-7}$ s, FDOA error = 1 Hz

| N_Sites | Rms position error (m) | Rms velocity error (m/s) |
|---|---|---|
| 10 | 28,100 | 0.735 |

The simulation data in Table 5 was obtained using realistic accuracy TDOA-only measurements with ten calibrators, and resulted in high position and velocity errors. Hence, if ten calibrators is regarded as being as large a number as one would wish to use, Table 5 shows that correction to within reasonable limits of error was not obtained using realistic accuracy TDOA-only measurements.

Two satellite correction simulation was performed using very accurate 'FDOA-only" data with results set out below in Table 6.

TABLE 6

Inc_min = 20, N_count = 72, TDOA error = $10^{-2}$ s, FDOA error = $10^{-6}$ Hz

| N_Sites | Rms position error (m) | Rms velocity error (m/s) |
|---|---|---|
| 3 | $6.71 \times 10^6$ | 490 |
| 4 | 10.1 | $7.32 \times 10^{-4}$ |
| 5 | 13.4 | $9.75 \times 10^{-4}$ |

Table 6 shows that with high accuracy FDOA-only measurements, ephemeris correction with reasonably low errors was obtained using four or more calibrators.

Two satellite correction simulation was performed using Realistic accuracy 'FDOA-only" data with results set out below in Table 7.

TABLE 7

Inc_min = 20, N_count = 72, TDOA error = $10^{-2}$ s, FDOA error = $10^{-3}$ Hz

| N_Sites | Rms position error (m) | Rms velocity error (m/s) |
|---|---|---|
| 9 | 9,050 | 0.658 |
| 10 | 1,230 | 0.0941 |

Table 7 shows that with realistic accuracy FDOA-only measurements, ephemeris correction with reasonably low errors was obtained using ten or more calibrators.

The data in Tables 3 to 7 show that it is feasible with currently available technology to correct or compensate for satellite ephemeris error using only TDOA or FDOA measurements, instead of both TDOA and FDOA as described earlier, provided that measurement accuracy and number of calibrators are adequate.

The equations given in the foregoing description can clearly be evaluated by appropriate computer software comprising program code instructions recorded on an appropriate carrier medium and running on a conventional computer system. The carrier medium may be a commercial product such as a memory, a magnetic tape, a floppy or compact or optical disc, or other hardware recordal medium; it may alternatively be an electrical or optical signal. Such software is straightforward for a skilled programmer to implement from the foregoing description without requiring invention, because it involves well known computational procedures.

The invention claimed is:

1. A non-transitory tangible computer readable storage medium storing a computer program for correcting satellite ephemeris error, the computer program comprising executable instructions that cause a computer to:
   a) determine at least one of measured time difference and measured frequency difference associated with signal replicas received via at least two different satellites from a plurality of calibration transmitting means of known but different geographical locations;
   b) calculate at least one of expected time difference and expected frequency difference by propagating initial satellite ephemeris elements including position and velocity vectors of the at least two different satellites to corresponding times of the at least one of expected time difference and expected frequency difference; and
   c) determine changes to the satellite ephemeris elements for correcting satellite ephemeris error by calculating a first difference between said at least one of expected time difference and expected frequency difference with the at least one of measured time difference and measured frequency difference,
   wherein the executable instructions to determine changes to the satellite ephemeris elements for correcting satellite ephemeris error comprises executable instructions that cause the computer to
   calculate an ephemeris correction vector as a product of the first difference and the changes to the satellite ephemeris elements,
   wherein the ephemeris correction vector [A] is calculated as $$[A] = \begin{bmatrix} a_1 \\ a_2 \\ a_3 \\ a_4 \\ a_5 \\ a_6 \end{bmatrix} =$$

$$\begin{bmatrix} \frac{\partial TDOA(t_1)}{\partial x} & \cdots & \frac{\partial TDOA(t_1)}{\partial z} \\ \vdots & & \vdots \\ \frac{\partial TDOA(t_N)}{\partial x} & \cdots & \frac{\partial TDOA(t_N)}{\partial z} \\ \frac{\partial FDOA(t_1)}{\partial x} & \cdots & \frac{\partial FDOA(t_1)}{\partial z} \\ \vdots & & \vdots \\ \frac{\partial FDOA(t_N)}{\partial x} & \cdots & \frac{\partial FDOA(t_N)}{\partial z} \end{bmatrix}^{-1} \left( \begin{bmatrix} TDOA_1 \\ \vdots \\ TDOA_N \\ FDOA_1 \\ \vdots \\ FDOA_N \end{bmatrix} - \begin{bmatrix} \langle TDOA \rangle_1 \\ \vdots \\ \langle TDOA \rangle_N \\ \langle FDOA \rangle_1 \\ \vdots \\ \langle FDOA \rangle_N \end{bmatrix} \right),$$

wherein TDOA is the measured time difference, FDOA is the measured frequency difference, <TDOA> is the expected time difference, and <FDOA> is the expected frequency difference—and the $a_1 \ldots a_6$ are the elements of the ephemeris correction vector A.

2. The non-transitory tangible computer readable storage medium of claim 1, further comprising executable instructions that cause the computer to
repeat the propagation of the initial satellite ephemeris elements by slightly adjusting the initial satellite ephemeris elements before the propagation.

3. The non-transitory tangible computer readable storage medium of claim 2, wherein the executable instructions that cause the computer to repeat the propagation comprises executable instructions that cause the computer to
iteratively perform the propagation until the first difference is within a prearranged iteration number limit.

4. An apparatus for correcting satellite ephemeris error comprising:
   a) a plurality of means for calibration transmitting of known but different geographical locations;
   b) means for determining at least one of measured time difference and measured frequency difference associated with signal replicas received via different satellites from the plurality of calibration transmitting means comprising a reference transmitter at a known geographical location and at least one ephemeris calibration transmitter at a substantially different known geographical locations;
   c) means for calculating at least one of expected time difference and expected frequency difference by propagating initial satellite ephemeris elements including position and velocity vectors to corresponding times of the at least one of time difference and frequency difference; and
   d) means for determining changes to the satellite ephemeris elements for correcting satellite ephemeris error by calculating a first difference between the at least one of expected time difference and expected frequency difference with the at least one of measured time difference and measured frequency difference,
   wherein means for determining changes to the satellite ephemeris elements for correcting satellite ephemeris error comprises
   means for calculating an ephemeris correction vector as a product of the first difference and the changes to the satellite ephemeris elements,
   wherein the ephemeris correction vector [A] is calculated as $$[A] = \begin{bmatrix} a_1 \\ a_2 \\ a_3 \\ a_4 \\ a_5 \\ a_6 \end{bmatrix} =$$

$$\begin{bmatrix} \frac{\partial TDOA(t_1)}{\partial x} & \cdots & \frac{\partial TDOA(t_1)}{\partial z} \\ \vdots & & \vdots \\ \frac{\partial TDOA(t_N)}{\partial x} & \cdots & \frac{\partial TDOA(t_N)}{\partial z} \\ \frac{\partial FDOA(t_1)}{\partial x} & \cdots & \frac{\partial FDOA(t_1)}{\partial z} \\ \vdots & & \vdots \\ \frac{\partial FDOA(t_N)}{\partial x} & \cdots & \frac{\partial FDOA(t_N)}{\partial z} \end{bmatrix}^{-1} \left( \begin{bmatrix} TDOA_1 \\ \vdots \\ TDOA_N \\ FDOA_1 \\ \vdots \\ FDOA_N \end{bmatrix} - \begin{bmatrix} \langle TDOA \rangle_1 \\ \vdots \\ \langle TDOA \rangle_N \\ \langle FDOA \rangle_1 \\ \vdots \\ \langle FDOA \rangle_N \end{bmatrix} \right),$$

wherein TDOA is the measured time difference, FDOA is the measured frequency difference, <TDOA> is the expected time difference, and <FDOA> is the expected frequency difference—and the $a_1 \ldots a_6$ are the elements of the ephemeris correction vector A.

5. The apparatus of claim 4, further comprising
means for repeating the propagation of the initial satellite ephemeris elements by slightly adjusting the initial satellite ephemeris elements before the propagation.

6. The apparatus of claim 5, wherein the means for repeating the propagation comprises
means for iteratively performing the propagation until the first difference is within a prearranged iteration number limit.

* * * * *